United States Patent [19]

Rush

[11] 4,365,820
[45] Dec. 28, 1982

[54] TRAILER CONNECTING RUNNING GEAR

[76] Inventor: Donald L. Rush, 2239 Kern, San Bernardino, Calif. 92405

[21] Appl. No.: 185,180

[22] Filed: Sep. 8, 1980

Related U.S. Application Data

[63] Continuation-in-part of Ser. No. 941,383, Sep. 12, 1978, abandoned.

[51] Int. Cl.³ ............................................. B62D 53/08
[52] U.S. Cl. .............................. 280/411 C; 280/80 B; 280/408; 280/476 R
[58] Field of Search .............. 280/408, 411 R, 411 C, 280/423 R, 423 A, 476 R, 656, 80 B, 81 R

[56] References Cited

U.S. PATENT DOCUMENTS

| | | | |
|---|---|---|---|
| 2,195,636 | 4/1940 | Ulrich | 280/408 |
| 2,590,962 | 4/1952 | Gurten | 280/408 |
| 3,066,953 | 12/1962 | Chosy | 280/423 A |
| 3,070,386 | 12/1962 | Gregg | 280/404 |
| 3,126,209 | 3/1964 | Jewell | 280/80 B |
| 3,152,837 | 10/1964 | Margala | 280/80 B |
| 3,181,914 | 5/1965 | Humes | 280/80 B |
| 3,374,010 | 3/1968 | Crockett | 280/81 R |
| 3,933,374 | 1/1976 | Arguin | 280/408 |

Primary Examiner—Joseph F. Peters, Jr.
Assistant Examiner—Donn McGiehan
Attorney, Agent, or Firm—Edgar W. Averill, Jr.

[57] ABSTRACT

An improved trailer connecting running gear for attachment to tractor drawn trailers, recreational vehicles and the like. The running gear is slidably affixed to a trailer frame and is held in a forward or rearward position by a double fifth wheel. The frame is vertically supported along substantially the entire overlapping portion of the trailer frame and the running gear. The running gear is held to the trailer frame so that it does not turn with respect to the frame.

5 Claims, 5 Drawing Figures

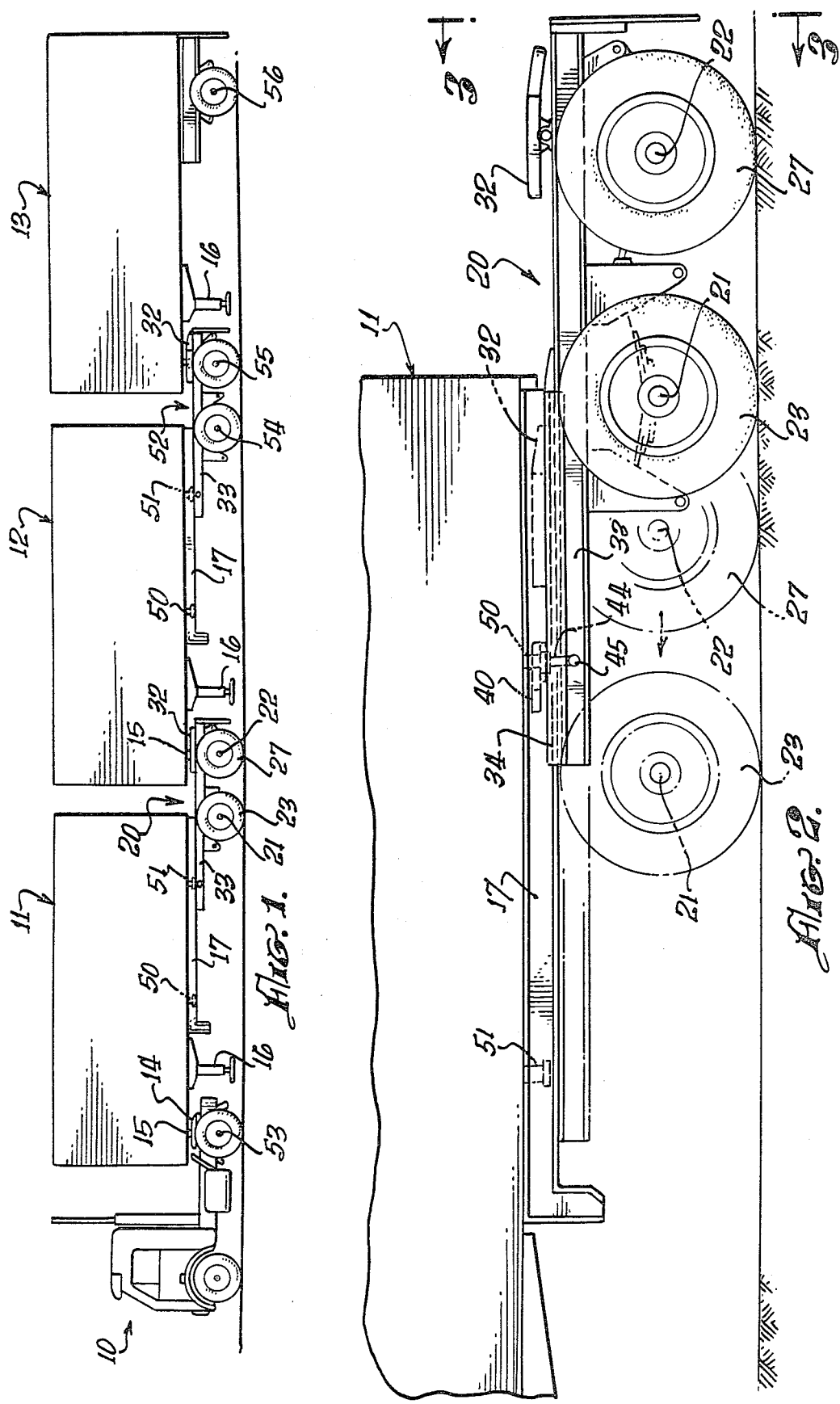

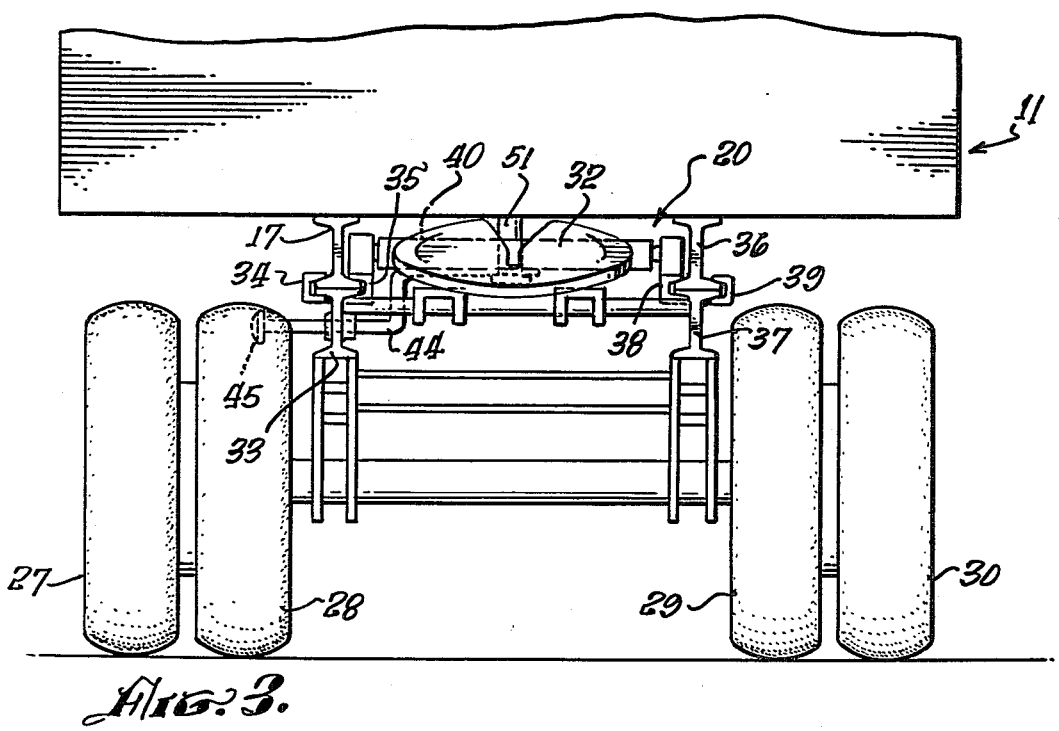
FIG. 3.
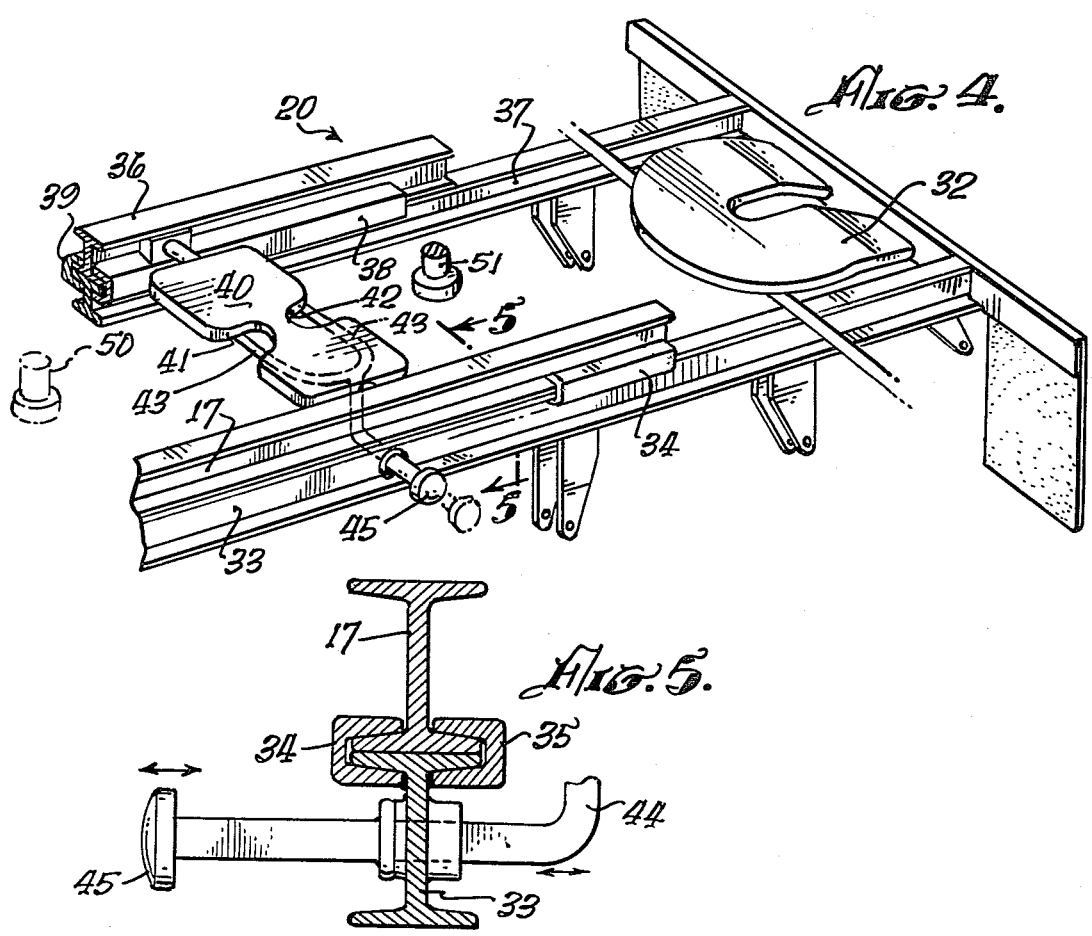
FIG. 4.
FIG. 5.

TRAILER CONNECTING RUNNING GEAR

CROSS REFERENCE TO RELATED APPLICATIONS

This application is a continuation-in-part of applicant's co-pending application, Ser. No. 941,383 filed Sept. 12, 1978, now abandoned.

BACKGROUND OF THE INVENTION

The field of the invention is tractor trailer running gears and the invention relates more specifically to trailer connecting dollies of the type commonly used to connect a second trailer to a first tractor-drawn trailer. This first tractor drawn trailer is commonly attached to the tractor by a fifth wheel. It is often desirable to attach a second trailer to the first trailer, and this is commonly accomplished by the use of a dolly which carries a fifth wheel, and is attached to the rear of the first trailer by an "I" bolt or pinnel hook and pin. In several states it is now permissible for a third trailer to be attached, and this likewise has, in the past, been connected to the second trailer through a second dolly.

A major difficulty with the use of such dollies results from the plurality of pivot points which exist at each fifth wheel and also at each "I" bolt and pin. The existence of such pivot points increases the hazard of fishtailing or jack knifing. They further essentially preclude the accurate backing of a multiple trailer rig for any significant distance.

A detachable dolly is shown in U.S. Pat. No. 2,590,962, although a less complex dolly is in more common use. The use of unitized shipping containers has given rise to a detachable wheel bogey and dolly, an example of which is shown in U.S. Pat. No. 3,066,953. When the bogey or dolly is moved to its forward position, however, the rear of the trailer is not properly supported. Other patents relating to tractor trailer attachments are U.S. Pat. Nos. 2,195,636; 3,070,386 and 3,933,374.

There is thus a need for a trailer-connecting dolly which provides improved control for the attachment of two or more trailers to a tractor. This need is especially acute for the attachment of three trailers to a tractor.

SUMMARY OF THE INVENTION

The present invention is for an improved trailer connecting running gear for tractor-drawn trailers, recreational vehicles and the like. The running gear is of the type having at least two axles resiliently attached to a frame and a fifth wheel affixed near the rearward part of the running-gear frame. The improvement of the present invention is a trailer gear frame attached to the under side of a trailer body which frame extends to about the rear of the trailer body. A running gear member including wheels is attached to the trailer gear frame in a manner to permit the longitudinal sliding of the running gear member with respect to the trailer gear frame. Locking means comprising a double fifth wheel hold the member and frame together in one forward position and one rearward position. The running gear holding means prohibits the rotational or turning movement of the running gear with respect to the trailer gear frame. Preferably the trailer has a pair of rails affixed along its under surface and the running gear has a mating pair of rails which support and slide along the tractor gear frame rails. The rails are preferably positioned inboard of the wheels of the running gear.

BRIEF DESCRIPTION OF THE DRAWINGS

FIG. 1 is a side elevation of a tractor having three trailers attached by the use of the running gear of the present invention.

FIG. 2 is an enlarged side elevation of the trailer gear frame and running gear of the present invention.

FIG. 3 is a cross-sectional elevation taken along line 3—3 of FIG. 2.

FIG. 4 is a perspective view of the trailer gear frame and running gear frame of the present invention.

FIG. 5 is a cross-sectional view taken along line 5—5 of FIG. 4.

DESCRIPTION OF THE PREFERRED EMBODIMENTS

A tractor 10 is attached to trailers 11, 12 and 13. While double tractor trailer combinations are widely permitted, there is an increasing trend toward the use of triple trailers, and such trailers are presently allowed in several Western United States. With the increasing importance of energy conservation, the continuation of this trend is anticipated.

Tractor 10 has a conventional fifth wheel 14, which is pivotally held to a king pin 15 in a conventional manner. Likewise, the landing gear 16 of trailer 11 is conventional.

A trailer running gear support frame 17 is permanently affixed to the underside of trailer 11. While trailer 11 is shown as a conventional box, the present invention is also useful for a flatbed trailer, a tanker, or even a bottom dump trailer. A running gear of the present invention is indicated generally by reference character 20 and has axles 21 and 22, each of which support four wheels 23 through 30. As shown more clearly in FIG. 2, the wheels are resiliently supported in a conventional manner by resilient means such as leaf springs 31, and a trunion apparatus of a relatively conventional nature is useful with the running gear of the present invention. A fifth wheel 32 is attached to the running gear frame 33. Frame 33 is slidingly attached to trailer running gear support frame 17, which permits the running gear frame to be moved from its rearward position as shown in FIG. 2 to its forward position as shown in phantom lines in FIG. 2.

As shown most clearly in FIGS. 3 and 4, the running gear support frame 17 which is attached to trailer 11 is slidably affixed to running gear frame 33 by a pair of channel members 34 and 35. Similarly, a second running gear support frame 36 is affixed to the underside of trailer 11 and is slidably held to a second running gear frame 37 by a pair of channel members 38 and 39. These channel members are welded or otherwise held to the running gear frame members 33 and 37 and should be held closely enough to permit sliding of the members, and yet not permit any appreciable lateral movement which would allow rotation or pivoting about the vertical axis of the running gear. In other words, the running gear of the present invention is unlike the prior art trailer dolly which is free to turn or pivot about its vertical axis. This feature of the present invention enables a rig utilizing the invention to be much safer against jack knifing and to be far more stable in hazardous situations such as curves when a portion of the truck runs off the shoulder of a highway, or is in a strong crosswind.

Another important feature of the firm support provided by channel members 34, 35, 38 and 39 is that the running gear is not allowed to tip with respect to the trailer. The conventional running gear being attached by a pin and "I" member will permit some turning movement of the dolly along the longitudinal axis of the trailer. It is therefore more likely that the end trailer will turn over in a hazardous situation such as running off the shoulder of the road or a strong crosswind, or both, because the prior art dolly does not prevent this movement. The running gear of the present invention, however, being firmly held to the forward trailer, is capable of preventing some turning over by virtue of the support provided by the tractor and forward trailer or trailers.

Turning now to FIG. 4, a double fifth wheel 40 has a pair of jaws 41 and 42, and a double latch and release member 43. One of the jaws faces forward and is connectable to a forward kingpin and the other jaw faces rearwardly and is connectable to a rearward kingpin. Latch 43 functions as the kingpin release member and has an arm 44 which is attached to a handle 45. Arm 44 passes through running gear frame 33 and allows the release and attachment of the kingpins which are affixed to the underside of trailer 11.

A forward kingpin 50 is affixed to the underside of trailer 11 as shown in FIG. 2, and a rear kingpin 51 is likewise affixed to the underside of trailer 11. When the running gear is in its rearward position, jaws 42 of double fifth wheel 40 are held to rear kingpin 51. When the running gear is in its forward position, jaws 41 are held to forward kingpin 50.

It is important that the running gear support frame which is affixed to the trailer and the running gear frame which is affixed to the running gear be firmly and slidably attached to one another. The channel member method shown in the drawings is one effective way of making such an attachment. The channel members 34, 35, 38 and 39 should be long enough so that the stress created along the two frames is spread over a wide area. It is believed that a length of about six feet is ideal. It would, of course, be possible to devise other support methods and a simple single extrusion could be used to achieve the same structure as the "I" beam and channel members shown, for instance, in FIG. 5.

In operation, the driver may move the running gear from its rearward position as shown in FIG. 2 to its forward position in the following manner. First, he would leave the cab, setting the brakes on all trailers. Secondly, he would lower the landing gear on the rearward trailer and pull the release on fifth wheel 32, unhooking the air hose and lights between trailer 12 and the running gear 20 of the trailer 11. He would then re-enter the cab and drive forward a distance of about 15 feet. He would then again set the brakes on running gear 20 and pull handle 45, releasing jaws 42 from rear kingpin 51. He would then back up until jaws 41 grasp forward kingpin 50. The running gear would then be securely held in the forward position as shown in phantom lines in FIG. 2.

An important feature of the present invention is the support which the running gear frame gives to the running gear support frame 17, along substantially the entire overlapping positions of the two frames. Thus, when the running gear is in its forward position, the running gear frame 33 supports the trailer running gear support frame along the entire length of running gear frame 33. When the running gear is in its rearward position running gear frame 33 supports frame 17 along the entire overlapping portion. This overlapping portion is approximately equal to the length of channel members 34, 35, 38 and 39. This support provides an important practical result related to weight distribution. A comparison of weight distribution by the use of the running gear of the present invention as compared to the use of a conventional dolly is as follows. If the rig of FIG. 1 contained a net weight of 20,000 pounds in trailer 11, trailer 12 was empty and trailer 13 contained 20,000 pounds of net weight the following portions of the net weight would be carried approximately as follows: 10,000 pounds on axle 53, 10,000 pounds distributed approximately equally between axles 54 and 55 and 10,000 pounds on axle 56. In contrast, if running gear 20 were replaced with a conventional dolly, the axle of the dolly would carry none of the net weight of the rig, since there would be no way of transferring the load weight of trailer 11 to a dolly which would be connected to trailer 11 through a pin and "I" hitch. The dolly which replaces running gear 52 would, of course, contain approximately half of the load of trailer 13. This imbalance of weight distribution creates a safety hazard in the event of a sudden stop because of the lack of load on the dolly which supports the front of trailer 12. The result could be jack knifing. It is for that reason that it is common practice to keep the empty trailer at the rear of the rig, but this has frequently resulted in the rear trailer turning over in a strong wind combined with either running off the shoulder of the road, or swinging as a result of a passing truck combined with an attempt to correct the swinging by the driver.

A still further advantage of the present invention is a decreased tendency to "cheat" when the rig is turning a sharp corner. As can readily be pictured from FIG. 1, in a turning situation the kingpin of trailer 12 will more accurately follow trailer 11 with the running gear of the present invention as compared to a dolly which is connected through a pin and clevis attachment at the end of trailer 11. The improved control on backing between the running gear of the present invention and the conventional dolly is even more evident, particularly in the three-trailer situation such as shown in FIG. 1.

The running gear frame indicated generally by reference character 52 is attached to trailer 12 in a manner analogous to that described above and a further description is not believed necessary for an understanding of the present invention. Trailer 13 is shown as a conventional single axle trailer. It would, of course, be possible to use the same moveable running gear on trailer 13 as is shown on trailers 11 and 12.

The running gear of the present invention although shown on a tractor and trailer combination is useful in various other applications such as recreational vehicles. The secure attachment of the running gear to the trailer greatly increases safety as compared to the conventional dolly which has a pair of pivot points, one at the end of the forward trailer and the second at the kingpin. This elimination of one pivot point at each dolly especially improves handling in those situations where the third trailer 13 is loaded and the second trailer 12 is not.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A running gear and trailer combination for tractor-drawn trailers, recreational vehicles and the like, especially useful for multiple trailers, said combination comprising:
   - a trailer support frame affixed to the underside of a trailer body, said trailer support frame having a support surface extending to about the rear of the trailer; and
   - a running gear member having a fifth wheel, said running gear member being slidingly attached to said trailer support frame by attachment means in a manner to permit both the longitudinal sliding of the running gear member with respect to the trailer support frame and the vertical support of the trailer support frame along substantially the entire overlapping portion of the running gear member and the trailer support frame and a locking means comprising a double fifth wheel having a pair of jaws, one jaw facing forward and one jaw facing rearward, and a pair of king pins affixed to the underside of the trailer to hold the double fifth wheel in a forward position or a rearward position, said running gear member having at least two rails slidingly held to the trailer support frame by said attachment means to prohibit the rotational movement of the running gear member with respect to the trailer support frame.

2. The device of claim 1 wherein said trailer support frame comprises a pair of parallel longitudinal rails permanently affixed to the underside of a trailer body.

3. The device of claim 1 wherein the fifth wheel is positioned between said rails.

4. The device of claim 1 wherein said rails are "I" beams.

5. The device of claim 1 wherein said attachment means with which said rails of said running gear member are affixed to the trailer support frame comprise two pairs of channel members.

* * * * *